(12) United States Patent
Yajima et al.

(10) Patent No.: US 7,237,905 B2
(45) Date of Patent: Jul. 3, 2007

(54) PROJECTION TYPE DISPLAY APPARATUS AND LAMP COOLING APPARATUS

(75) Inventors: Akihito Yajima, Kanagawa (JP); Hiroshi Nagai, Kanagawa (JP); Masami Sato, Chiba (JP); Yuji Kawasaki, Ibaraki (JP); Daisuke Shirato, Chiba (JP); Yoshihiko Okamura, Tokyo (JP); Dai Yoneya, Tokyo (JP); Takuji Ohkubo, Chiba (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 10/887,385

(22) Filed: Jul. 8, 2004

(65) Prior Publication Data

US 2005/0036116 A1    Feb. 17, 2005

(30) Foreign Application Priority Data

Jul. 10, 2003   (JP)   ............................. 2003-273019

(51) Int. Cl.
*G03B 21/16*   (2006.01)

(52) U.S. Cl. .............................. 353/61; 353/60; 353/97; 348/748

(58) Field of Classification Search ................. 353/52, 353/53, 119, 57–61, 97; 349/57, 58; 348/748, 348/789, 794; 362/264, 294, 373
See application file for complete search history.

(56) References Cited

U.S. PATENT DOCUMENTS

| | | | |
|---|---|---|---|
| 5,329,436 A * | 7/1994 | Chiu ........................... | 362/294 |
| 5,666,171 A | 9/1997 | Nakamura et al. ............ | 349/58 |
| 5,936,696 A * | 8/1999 | Daijogo et al. .............. | 349/161 |
| 6,443,575 B1 | 9/2002 | Miyamoto et al. ............ | 353/58 |
| 6,846,096 B2 * | 1/2005 | Hsu et al. .................... | 362/294 |
| 2002/0163627 A1 * | 11/2002 | Ohishi et al. ................. | 353/58 |
| 2004/0076009 A1 * | 4/2004 | Liao ........................... | 362/294 |

FOREIGN PATENT DOCUMENTS

| | | | |
|---|---|---|---|
| DE | 36 00 775 | | 7/1987 |
| JP | 7-311420 | | 11/1995 |
| JP | 9-304835 | | 11/1997 |
| JP | 10-286236 | | 10/1998 |
| JP | 11-202412 | * | 7/1999 |
| JP | 3066496 | | 5/2000 |
| JP | 2000-195332 | | 7/2000 |
| JP | 2002-90875 | | 3/2002 |
| WO | WO 00/73850 | | 12/2000 |

* cited by examiner

*Primary Examiner*—W. B. Perkey
*Assistant Examiner*—Andrew Sever
(74) *Attorney, Agent, or Firm*—Frommer Lawrence & Haug LLP; William S. Frommer; Thomas F. Presson (57) ABSTRACT

In an LCD projector or other projection type display apparatus which uses a lamp such as a xenon lamp for a light source, the lamp is cooled efficiently without increasing ambient noises or without causing the whole apparatus to become large-sized, and at the same time the lifetime and the reliability of a fan which cools the lamp is made improved. When fans 3 and 4 which are disposed on a front side of the lamp mounted with a heat sink 1 rotate, external air of ordinary temperature is taken inlet and guided into ducts 5 and 6 so as to be blown onto the front face of the lamp by means of the fans 3 and 4. Then, high temperature air which was warmed by being blown onto the lamp is exhausted from an outlet to the outside.

9 Claims, 10 Drawing Sheets

PROJECTION TYPE DISPLAY APPARATUS AND LAMP COOLING APPARATUS

BACKGROUND OF THE INVENTION

1. Field of the Invention

The present invention relates to a projection type display apparatus using a lamp such as a xenon lamp for a light source and to an apparatus for cooling that lamp.

2. Description of the Related Art

An LCD projector is widely used as a video display apparatus for a large-sized screen. An LCD projector, as is well known, is constituted such that radiated light from a light source is condensed and irradiated onto a liquid crystal panel and the light modulated by the liquid crystal panel corresponding to a video signal is projected onto a screen.

A discharge lamp is widely used as a light source of the LCD projector. Among these discharge lamps, a xenon lamp has a strong spectrum component of a red color as compared with other discharge lamps (ultra high voltage mercury lamp, etc.) so that it has an advantage that natural color rendering properties can be realized without emphasizing a blue color or a green color too much.

However, on the other hand, the heat-radiation value becomes great, because the xenon lamp has a need for high wattage for realizing the same brightness as that of other discharge lamps. Therefore, it becomes very important for an LCD projector using a xenon lamp as a light source to cool the xenon lamp.

Heretofore, it is known that for an LCD projector using a xenon lamp operating as a light source, a fan is disposed on the rear side of the xenon lamp and air suction is carried out by the fan such that cooling air is taken in from the front side of the xenon lamp (for example, see Patent Reference 1).

Figure 1:
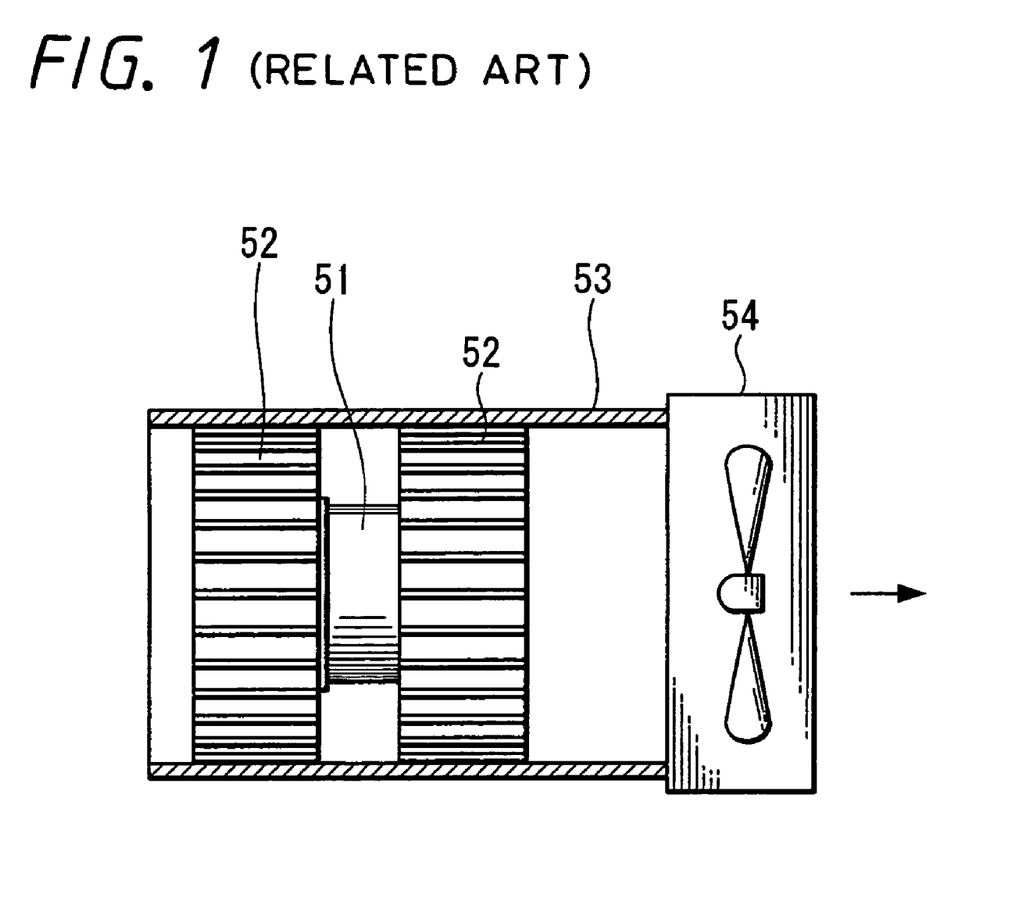
FIG. 1 is a diagram showing a cooling system of a xenon lamp according to a conventional LCD projector.

FIG. 1 is a diagram showing a brief overview according to such a conventional cooling system. A heat sink 52 is mounted on a xenon lamp 51 and the xenon lamp 51 and the heat sink 52 are contained in a lamp duct 53.

A fan 54 is disposed on the rear side (right direction in the drawing) of the lamp duct 53. Air suction is carried out by the fan 54 such that cooling air is taken in from the front side (left direction in the drawing) of the lamp duct 53 into the lamp duct 53. This air is exhausted to the rear side through the fan 54 after passing through the xenon lamp 51 and the heat sink 52.

[Cited Patent Reference 1] Jap. Registered Pat. No. 3348653 (see paragraph Nos. 0004 and 0017, FIGS. 1 and 6)

However, there are disadvantages such as (a) or (b) as described below in the conventional cooling system.

(a) It is important to prevent the temperature increase of a glass (usually sapphire glass is used) which is disposed at the front face of the xenon lamp and operates as a light radiation plane in order to maintain the temperature of the xenon lamp. However, in a case when air suction is carried out by the fan on the rear side of the xenon lamp, it is not easy for the air to hit the glass directly and even if it hits, the force thereof is weak, so that it is difficult to adequately prevent the temperature increase of the glass.

In addition, if it is conversely attempted to prevent the temperature increase of the glass, the rotational speed of the fan should be made considerably high or a considerably large-scaled fan should be used. However, this will create an increase in ambient noises and the whole LCD projector becomes large sized.

(b) The temperature of the fan will increase, because high temperature air warmed by the xenon lamp and the heat sink will hit the fan. As a result, lubrication oil applied to the rotational axis of the fan motor will evaporate so as to increase rotational resistance thereof and at the same time abnormal noises will be generated or burning will occur in the fan such that the life time and the reliability of the fan will be lowered.

SUMMARY OF THE INVENTION

In view of the aforementioned aspect, the present invention was invented for a LCD projector or other projection type display apparatus which uses a lamp such as a xenon lamp for a light source, the lamp is cooled efficiently without increasing ambient noises or without causing the whole apparatus to become large-sized, and at the same time the lifetime and the reliability of a fan which cools the lamp is improved.

In order to solve this subject matter, the present invention proposes a projection type display apparatus using a lamp as a light source which comprises a fan disposed on a front side of the lamp for blowing air onto a front face of the lamp; an inlet for taking in external air into the inside of the projection type display apparatus; a duct for guiding air entered into the inside of the projection type display apparatus from the inlet to the fan; and an outlet for exhausting the air blown onto the lamp to the outside of the projection type display apparatus.

In this projection type display apparatus, when a fan rotates, external air of ordinary temperature is taken in from an inlet and guided into a duct so as to be blown onto a front face (face from which light radiates) of a lamp by means of the fan which is disposed on a front side of the lamp operating as a light source. Then, high temperature air which was warmed by being blown onto the lamp is exhausted from an outlet to the outside. In this manner, it is possible to prevent the temperature increase of the front face of the lamp by blowing air onto the front face of the lamp directly even if a rotational speed of the fan is lowered or a small sized fan is used differently from a conventional case where air suction is carried out by a fan on a rear side of the lamp. Therefore, the lamp operating as a light source can be cooled efficiently without increasing ambient noises or without causing the whole apparatus to become large-sized.

In addition, air of ordinary temperature (air before being warmed by the lamp) from the outside hits the fan, so that the temperature of the fan never increases as opposed to the conventional case where air suction is carried out by the fan on a rear side of the lamp. In this manner, the lifetime and the reliability of the fan will be improved.

It should be noted that in a case when a xenon lamp is used as the light source, it is suitable, as one example, to blow air by the fan onto a glass of the front face of the xenon lamp. In this manner, it is possible to prevent the temperature increase of the glass adequately, so that it becomes possible to cool the xenon lamp efficiently.

Also, in the projection type display apparatus, it is suitable, as one example, to dispose two fans on a diagonal left front side and on a diagonal right front side of the lamp respectively.

Accordingly, it becomes possible to prevent the temperature increase of the front face of the lamp adequately by blowing air onto the front face of the lamp without blocking a light path of a light radiated from the lamp (while the optical system is maintained to be disposed at the front on the front side of the lamp). In addition, by using two fans in this manner, it is possible to lower the rotational speed of the individual fans more, so that it becomes possible to prevent ambient noises more.

Also, in the projection type display apparatus, it is suitable, as one example, to mount a heat sink coated with a material having a thermal radiation characteristic, to cover the heat sink with a transparent member and at the same time to expose this transparent member to the outside of the projection type display apparatus.

If a heat sink coated with a material having a thermal radiation characteristic is mounted on the lamp, it is possible to cool the lamp by means of the heat radiation. However, if an opaque member (general resin member, etc.) is used as a cover for protecting the heat sink from an external force and the like or if the heat sink is covered by the housing of the projection type display apparatus itself, the radiation heat from the heat sink is absorbed or reflected by its cover or the housing, and that heat is transmitted again to the lamp.

On the other hand, the radiation heat from the heat sink is exhausted to the outside of the projection type display apparatus passing through the transparent member by covering the heat sink with a transparent member and also by exposing the transparent member to the outside of the projection type display apparatus. In this manner, it becomes possible to cool the lamp more efficiently by utilizing a cooling effect owing to the heat radiation.

Also, in a case when a reflection plate for reflecting light in a region outside a visible light included in the radiated light from the lamp to the lamp side by adding a fixed angle is not provided for the projection type display apparatus, it is suitable, as one example, to dispose a member at the front of the lamp for passing the radiated light from the lamp and also for light-shielding the reflected light from the reflection plate.

In order to irradiate only visible light onto the spatial light modulation device, it is designed sometimes in this manner to reflect light in a region outside a visible light to the lamp side by adding a fixed angle such that the reflected light does not enter the lamp directly. However, reflected light irradiates from the heat sink mounted on the housing of the lamp or on the lamp and it sometimes happens that this phenomenon becomes a cause of temperature increase of the lamp or a cause for lowering the life time or the reliability of the lamp.

On the other hand, if a member is disposed on the front side of the lamp for passing the radiated light from the lamp and also for light-shielding the reflected light from the reflection plate, the radiated light from the lamp enters the reflection plate without being blocked by the member and at the same time the light in a region outside a visible light which was reflected by the reflection plate is blocked by the member such that it comes not to irradiate the heat sink mounted on the housing of the lamp or on the lamp. In this manner, the temperature increase of the lamp caused by the reflected light is prevented, so that the cooling efficiency of the lamp is made much higher and the life time and the reliability of the lamp are made also improved.

Also, in the projection type display apparatus, it is suitable, as one example, to dispose a power supply circuit in the duct.

In this manner, the power supply circuit comes to be exposed to the air of ordinary temperature from the outside and passing inside the duct, so that it becomes possible to cool the lamp and at the same time to cool the power supply circuit.

Next, the present applicant proposes a lamp cooling apparatus comprising a lamp; a fan disposed on a front side of the lamp for blowing air onto a front face of the lamp; and a duct for guiding external air to the fan.

In this lamp cooling apparatus, when a fan rotates, external air of ordinary temperature is guided into a duct so as to be blown onto a front face of a lamp by means of the fan which is disposed on a front side of the lamp. In this manner, it is possible to prevent the temperature increase of the front face of the lamp adequately by blowing air onto the front face of the lamp directly even if a rotational speed of the fan is made lowered or a small sized fan is used differently from a conventional case where air suction is carried out by a fan on a rear side of the lamp. Therefore, the lamp can be cooled efficiently without increasing ambient noises or without causing the whole apparatus to become large-sized.

In addition, air of ordinary temperature (air before being warmed by the lamp) from the outside hits the fan, so that the temperature of the fan never increases as opposed to the conventional case where air suction is carried out by the fan on a rear side of the lamp. In this manner, the lifetime and the reliability of the fan will be improved.

It should be noted that in a case when a xenon lamp is cooled, it is suitable, as one example, to blow air using a fan onto a glass of the front face of the xenon lamp. In this manner, it is possible to prevent the temperature increase of the glass adequately, so that it becomes possible to cool the xenon lamp efficiently.

Also, in the lamp cooling apparatus, it is suitable, as one example, to dispose two fans on a diagonal left front side and on a diagonal right front side of the lamp respectively.

Accordingly, it becomes possible to prevent the temperature increase of the front face of the lamp adequately by blowing air onto the front face of the lamp without blocking a light path of a light radiated from the lamp (while the optical system is maintained to be disposed at the front on the front side of the lamp). In addition, by using two fans in this manner, it is possible to lower the rotational speed of the individual fans more, so that it becomes possible to prevent ambient noises more.

Also, in the lamp cooling apparatus, it is suitable, as one example, to mount a heat sink coated with a material having a thermal radiation characteristic and to cover the heat sink with a transparent member.

If a heat sink coated with a material having a thermal radiation characteristic is mounted on the lamp, it is possible to cool the lamp by means of the heat radiation. However, if an opaque member (general resin member, etc.) is used as a cover for protecting the heat sink, the radiation heat from the heat sink is absorbed or reflected by its cover, and that heat is transmitted again to the lamp.

On the other hand, the radiation heat from the heat sink is exhausted to the outside passing through the transparent member by covering the heat sink with a transparent member. In this manner, it becomes possible to cool the lamp more efficiently by utilizing a cooling effect owing to the heat radiation.

Also, in the lamp cooling apparatus it is suitable to dispose a member at the front of the lamp for passing the radiated light from the lamp and also for light-shielding the reflected light reflected to the lamp side with an added fixed angle.

In a projection type display apparatus, for example, in order to irradiate only visible light onto the spatial light modulation device, it is designed sometimes to reflect light in a region outside a visible light to the lamp side by adding a fixed angle such that the reflected light does not enter the lamp directly. However, the reflected light irradiates from the heat sink mounted on the housing of the lamp or on the lamp and it sometimes happens that this phenomenon becomes a cause of temperature increase of the lamp or a cause for lowering the life time or the reliability of the lamp.

On the other hand, if a member is disposed on the front side of the lamp for passing the radiated light from the lamp and also for light-shielding the reflected light reflected to the lamp side by adding a fixed angle, the radiated light from the lamp is never blocked by the member and at the same time the light in a region outside a visible light which was reflected is blocked by the member such that it comes not to irradiate the heat sink mounted on the housing of the lamp or on the lamp. In this manner, the temperature increase of the lamp caused by the reflected light is prevented, so that the cooling efficiency of the lamp is made much higher and the life time and the reliability of the lamp are made also improved.

According to the projection type display apparatus of the present invention, air of ordinary temperature from the outside is blown directly onto a front face of a lamp operating as a light source by a fan which is disposed on the front side of the lamp operating as a light source, so that it is possible to prevent temperature increase of the front face of the lamp adequately even if the rotational speed of the fan is lowered or a small sized fan is used. Therefore, an effect that the lamp operating as a light source can be cooled efficiently without increasing ambient noises or without causing the whole of the projection type display apparatus to become large-sized can be obtained.

Also, air of ordinary temperature from the outside hits the fan and the temperature of the fan never increases, so that an effect that the life time and the reliability of the fan are improved can be obtained.

Also, an effect that it is possible to cool a xenon lamp efficiently by blowing air onto a glass of a front face of the xenon lamp can be obtained.

Also, an effect can be obtained by disposing two fans on the diagonal left front side and on the diagonal right front side of the lamp where it is possible to prevent the temperature increase of the front face of the lamp adequately by blowing air onto the front face of the lamp without blocking a light path of a light radiated from the lamp (while the optical system is maintained to be disposed at the front on the front side of the lamp) and at the same time it is possible to lower the rotational speed of the individual fan more, so that it is possible to prevent ambient noises more.

Also, an effect that it is possible to cool the lamp more efficiently utilizing the cooling effect of the heat radiation can be obtained by mounting a heat sink coated with a material having a thermal radiation characteristic on the lamp, by covering the heat sink with a transparent member and by exposing the transparent member to the outside of the projection type display apparatus.

Also, by disposing a member on the front side of the lamp for passing through the radiated light from the lamp and also for light-shielding the reflected light from the reflection plate which reflects light in a region outside a visible light to the lamp side, the temperature increase of the lamp caused by the reflected light is prevented, so that an effect that the lamp cooling efficiency is made much higher and the life time and the reliability of the lamp are also improved can be obtained.

Also, by disposing a power supply circuit in the duct, an effect that it is possible to cool the lamp and cool the power supply circuit simultaneously can be obtained.

Next, according to the lamp cooling apparatus of the present invention, air of ordinary temperature from the outside is blown directly onto a front face of a lamp by a fan which is disposed on the front side of the lamp, so that it is possible to prevent temperature increase of the front face of the lamp adequately even if the rotational speed of the fan is made lowered or a small sized fan is used. Therefore, an effect that the lamp can be cooled efficiently without increasing ambient noises or without causing the whole of the projection type display apparatus to become large-sized can be obtained.

Also, air of ordinary temperature from the outside hits the fan and the temperature of the fan never increases, so that an effect that the life time and the reliability of the fan are improved can be obtained.

Also, an effect that it is possible to cool a xenon lamp efficiently by blowing air onto a glass of a front face of the xenon lamp can be obtained.

Also, an effect can be obtained by disposing two fans on the diagonal left front side and on the diagonal right front side of the lamp where it is possible to prevent the temperature increase of the front face of the lamp adequately by blowing air onto the front face of the lamp without blocking a light path of a light radiated from the lamp (while the optical system is maintained to be disposed at the front on the front side of the lamp) and at the same time it is possible to lower the rotational speed of the individual fan more, so that it is possible to prevent ambient noises more.

Also, an effect that it is possible to cool the lamp more efficiently utilizing the cooling effect of the heat radiation can be obtained by mounting a heat sink coated with a material having a thermal radiation characteristic on the lamp and by covering the heat sink with a transparent member.

Also, by disposing a member on the front side of the lamp for passing through the radiated light from the lamp and also for light-shielding the reflected light reflected to the lamp side by adding a fixed angle, the temperature increase of the lamp caused by the reflected light is prevented, so that an effect that the lamp cooling efficiency is made much higher and the life time and the reliability of the lamp are also improved can be obtained.

DESCRIPTION OF THE PREFERRED EMBODIMENTS

Hereinafter, it will be explained more specifically using drawings with respect to examples applied with the present invention relating to the LCD projector using a xenon lamp as a light source.

Figure 2:
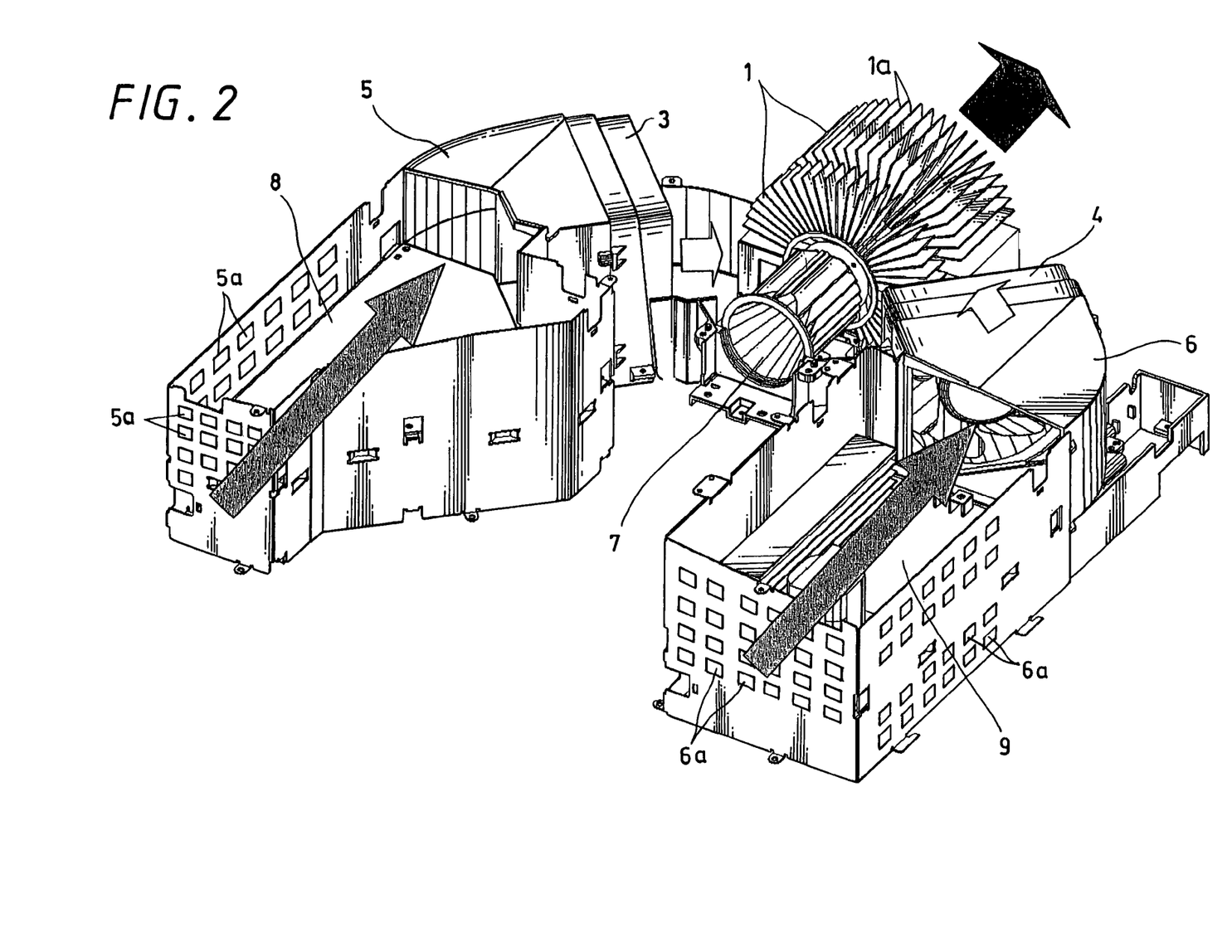
FIG. 2 is a perspective view of a cooling structure of a xenon lamp according to the present invention.
Figure 3:
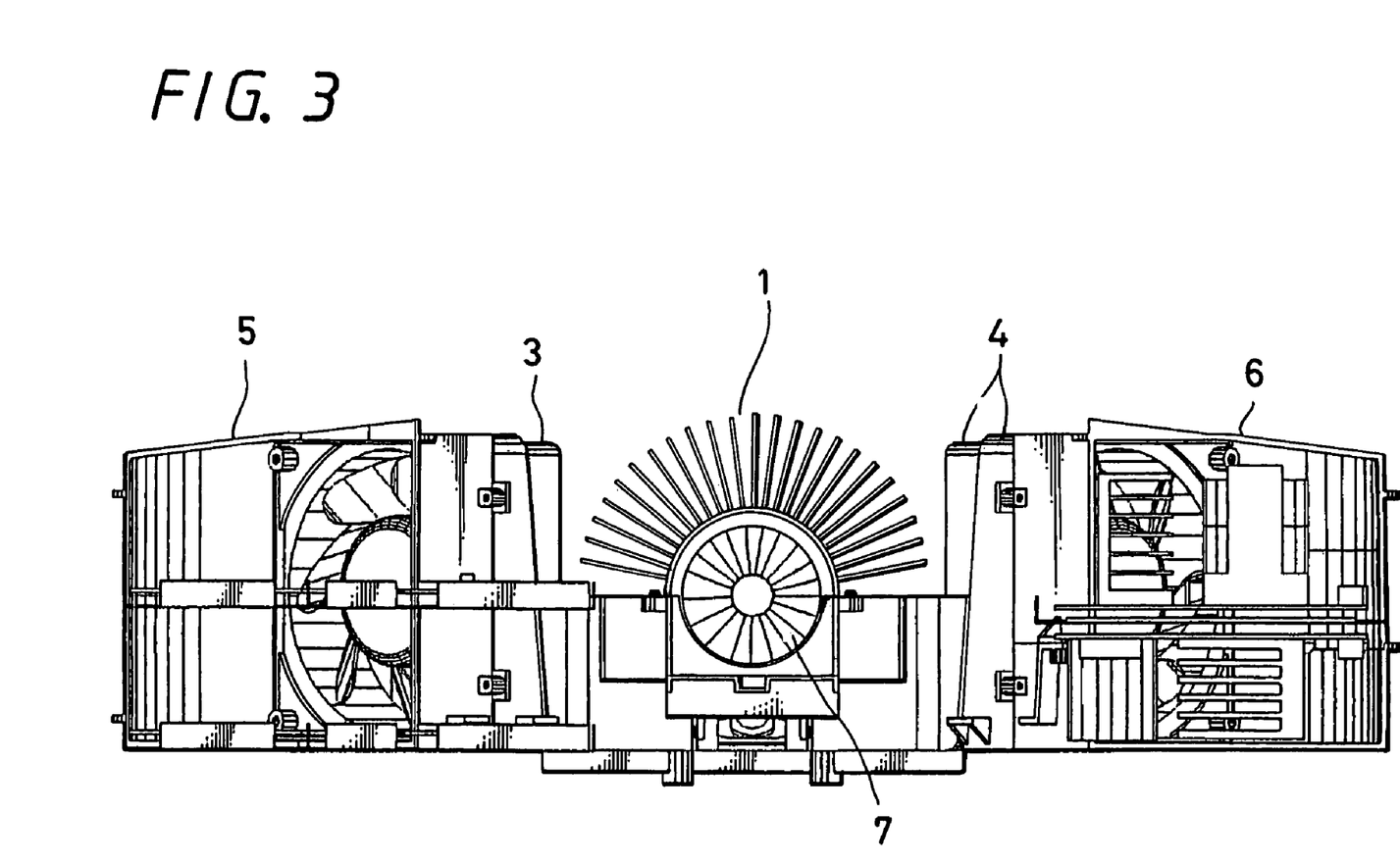
FIG. 3 is a front elevational view of a cooling structure of a xenon lamp according to the present invention.
Figure 4:
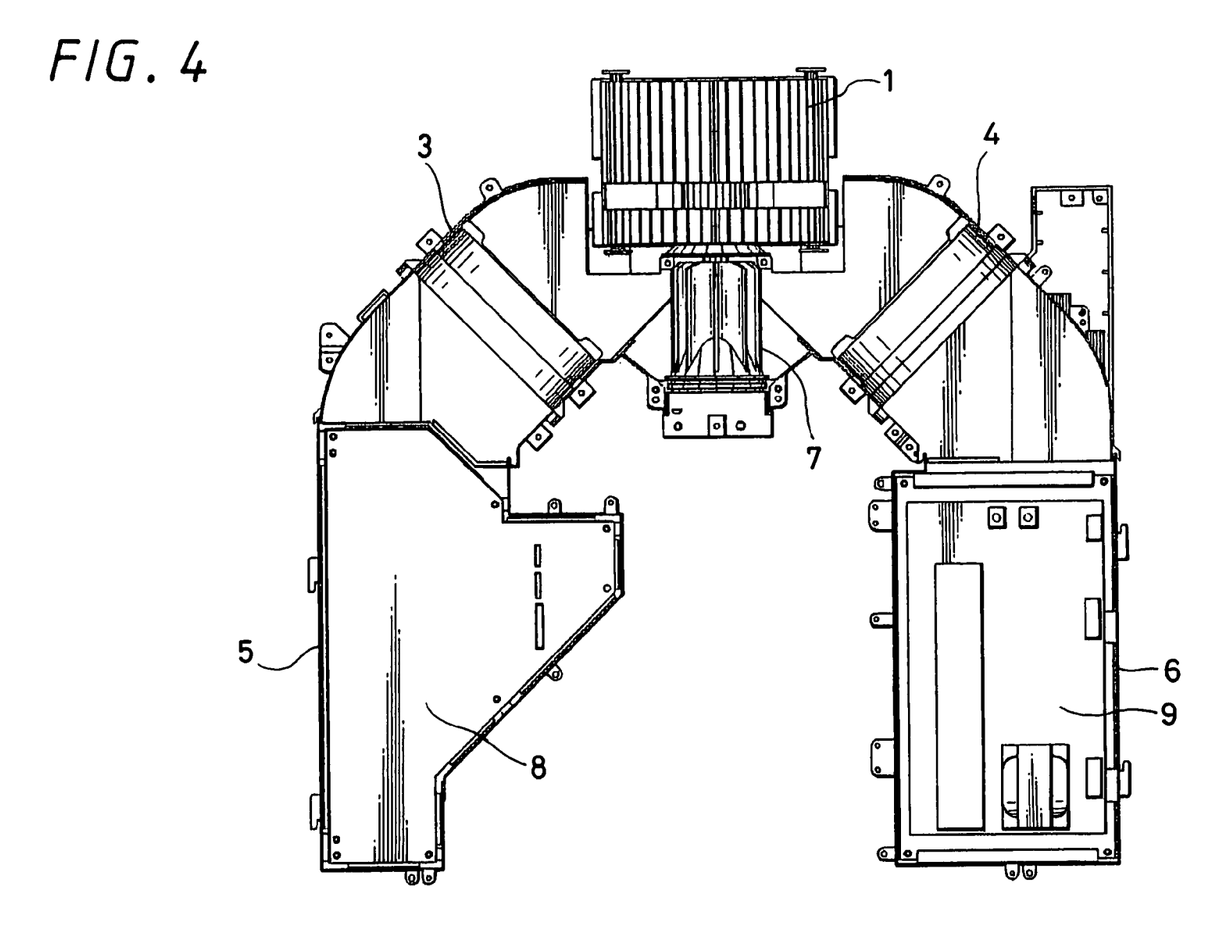
FIG. 4 is a plane view of a cooling structure of a xenon lamp according to the present invention.
Figure 5:
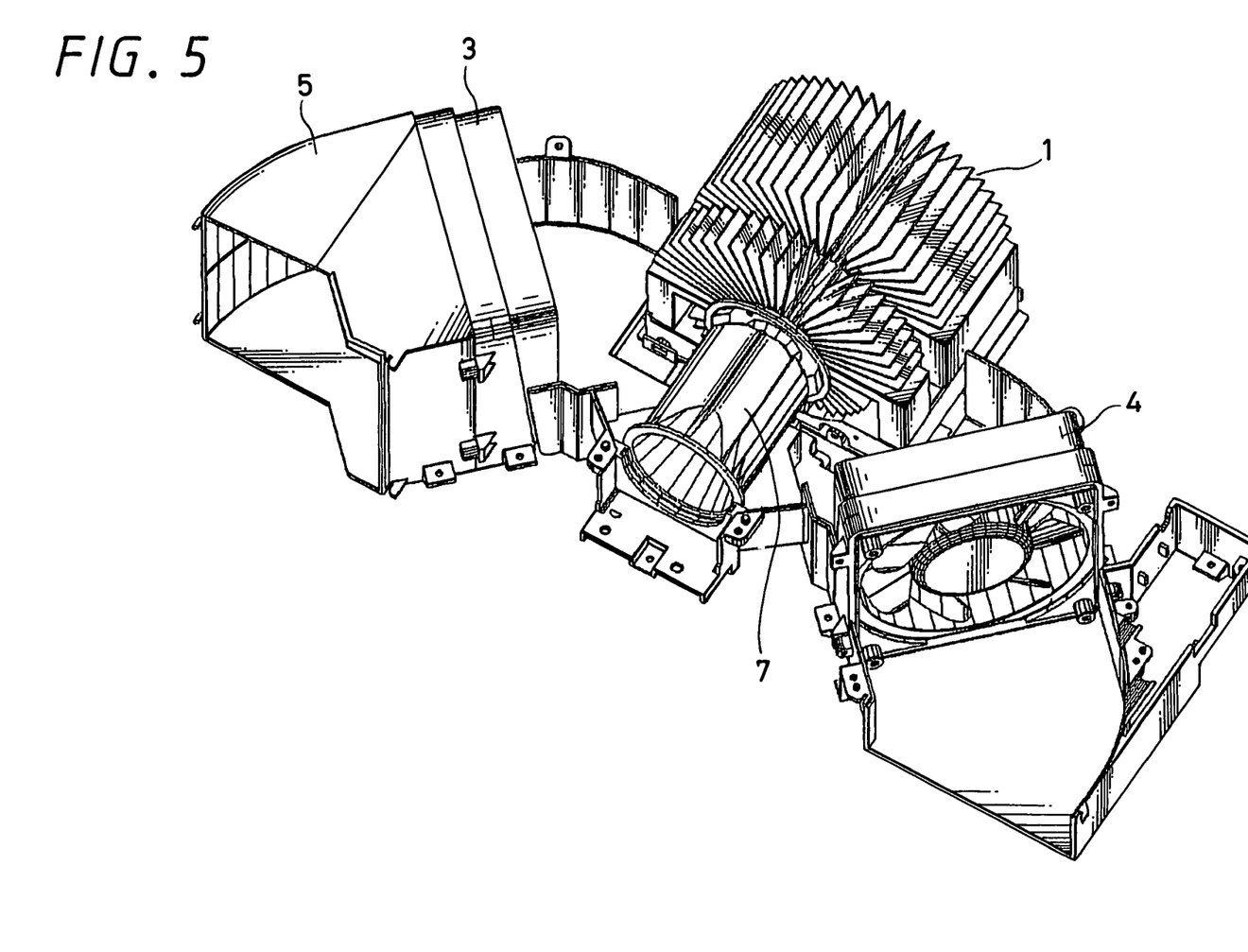
FIG. 5 is a perspective view of a main portion of a cooling structure of a xenon lamp according to the present invention.

FIG. 2 is a perspective view showing a structure of a cooling structure of a xenon lamp in an LCD projector applied with the present invention. Also, FIG. 3 and FIG. 4 are a front elevational view and a plane view of the cooling structure respectively and FIG. 5 is a perspective view of a main portion of the cooling structure. In these drawings, pair of heat sinks 1 is mounted on a xenon lamp as a light source and also operate as an electrode of the xenon lamp.

Figure 6:
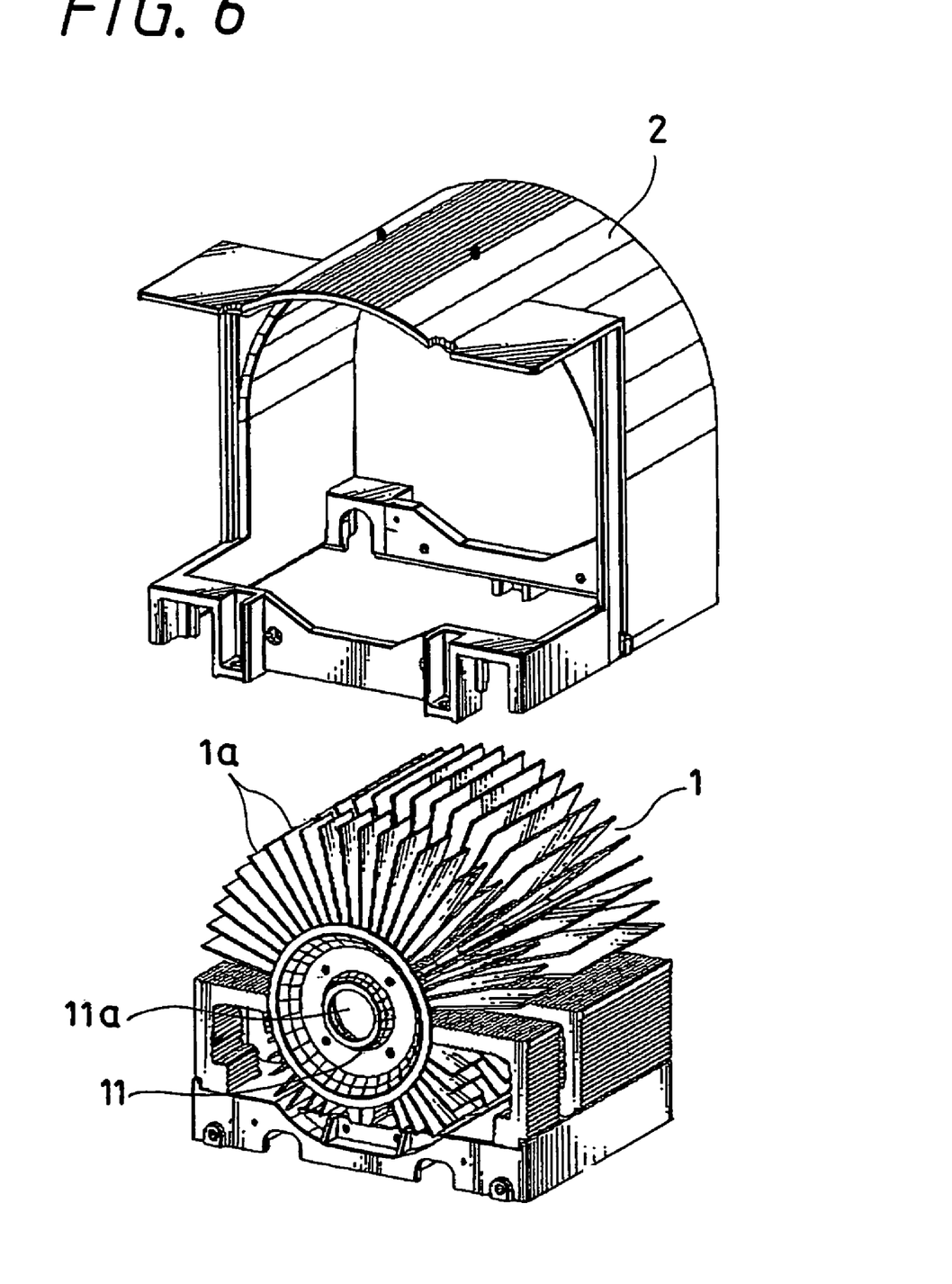
FIG. 6 is a perspective view of a heat sink portion of the cooling structure shown in FIG. 2 to FIG. 5.
Figure 7:
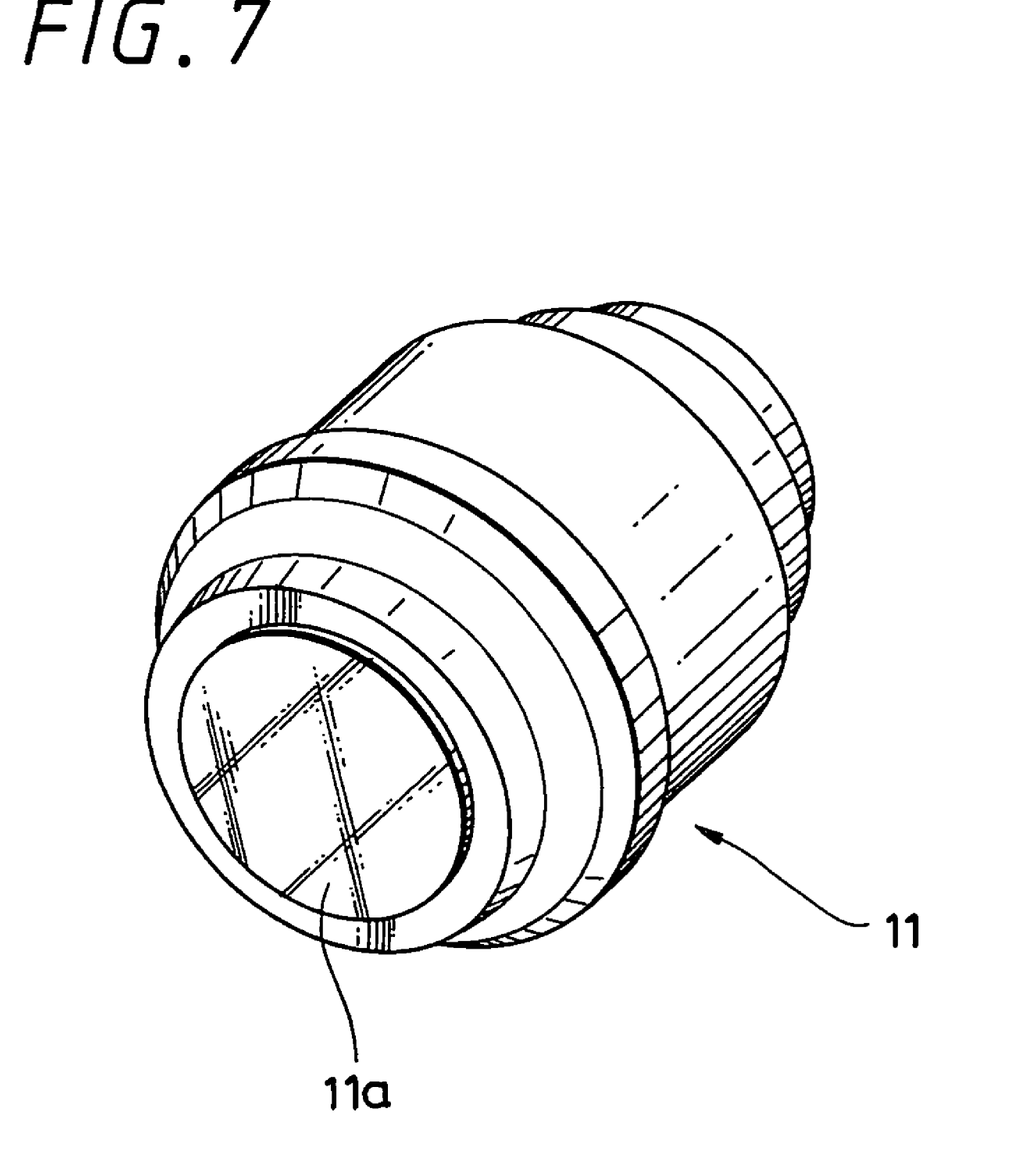
FIG. 7 is a perspective view of a xenon lamp.

FIG. 6 is a perspective view of a portion of the heat sink 1 picked up from the cooling structure. Also, FIG. 7 is a perspective view showing a xenon lamp on which the heat sink 1 is mounted by means of a simple body. As shown in FIG. 7, a xenon lamp 11 includes a sapphire glass 11a on a front face and light is radiated or emitted to the outside passing through the sapphire glass 11a.

As shown in FIG. 6, the heat sink 1 is mounted on the front portion and the rear portion of the side face of the housing of the xenon lamp 11 and has a lot of thin plate shaped fins 1a formed radially. The heat sink 1 is made of aluminum and the surface thereof is coated with a ceramic material which is a material having a thermal radiation characteristic. As for the ceramic material suitable for such a coating, there exists, for example, "Okitsumo Cool Tech." manufactured by Okitsumo Kabushikikaisha.

Although the drawing is omitted in FIG. 2 to FIG. 5, the heat sink 1 is covered by an enclosure 2 for being protected from an external force and the like as shown in FIG. 6. The enclosure 2 is made of transparent and colorless polycarbonate.

As shown in FIG. 2 to FIG. 5, a fan 3 for blowing air onto the sapphire glass 11a (FIG. 6 and FIG. 7) of the front face of the xenon lamp 11 is disposed on a diagonal left front side (direction inclined approximately 45° from the front face on the front side) of the heat sink 1. In addition, a fan 4 for blowing air onto the sapphire glass 11a is disposed also on a diagonal right front side (direction inclined approximately 45° from the front face on the front side) of the heat sink 1.

A duct 5 is provided for guiding air to the fan 3. A duct 6 is provided for guiding air to the fan 4. A space is secured between the fan 3, the duct 5 and the fan 4, the duct 6 for installing an optical system (an illumination optical system for guiding radiated light from the xenon lamp 11 to a liquid crystal panel and a projection optical system for projecting light modulated in the liquid crystal panel to the outside) at the front face on the front side of the xenon lamp 11 mounted with the heat sink 1.

A return light absorbing member 7 is disposed at the front face on the front side of the heat sink 1 by being made apart slightly from the xenon lamp 11 and the heat sink 1. The return light absorbing member 7 a mold made of aluminum which was manufactured by die casting. Similarly as the heat sink 1, it has a lot of thin plate shaped fins formed radially. It is constituted such that the air blown from the fans 3 and 4 also hits the fins of the return light absorbing member 7.

Figure 8:
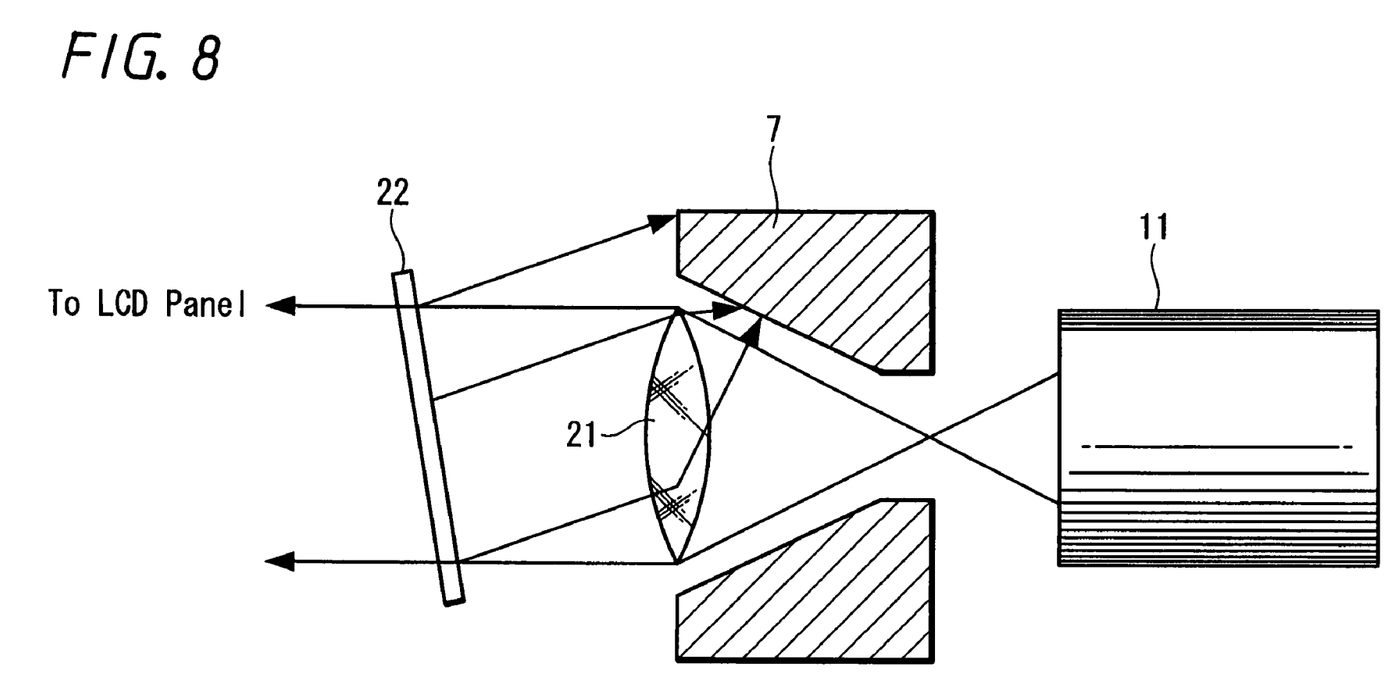
FIG. 8 is a diagram showing a role of die casting used in FIGS. 2 to 5.

FIG. 8 is a diagram showing a cross-sectional structure and a role of the return light absorbing member 7. In the illumination optical system (illumination optical system installed in a space between the fan 3, the duct 5 and the fan 4, the duct 6 mentioned above) of the LCD projector, a UV/IR reflection plate 22 is provided in a succeeding stage of a lens 21 which makes the radiated light from the xenon lamp 11 into a parallel beam of light for reflecting light of a visible light region (ultraviolet light and infrared light) in order to irradiate only visible light to the liquid crystal panel to a direction of the xenon lamp 11 side. The UV/IR reflection plate 22 is made inclined as much as a fixed angle (for example, 4°) with respect to a plane perpendicular to the light axis such that directly reflected light will not enter the light radiation plane of the xenon lamp 11 (sapphire glass 11a in FIGS. 6 and 7). However, it sometimes happens that the reflected light irradiates the heat sink 1 mounted on the housing of the xenon lamp 11 or on the xenon lamp 11.

The return light absorbing member 7 makes the radiated light from the xenon lamp 11 enter the lens 21 without blocking it and at the same time is formed as a pot shaped hollow structure which can absorb the reflected light from the UV/IR reflection plate 22. The return light absorbing member 7 is disposed between the xenon lamp 11 and this lens 21, makes the radiated light from the xenon lamp 11 enter the UV/IR reflection plate 22 through the lens 21 without blocking it and also has a role for light-shielding the reflected light from the UV/IR reflection plate 22 and for preventing it from irradiating the housing of the xenon lamp 11 or the heat sink 1.

As shown in FIGS. 2 and 4, there is disposed on the windward side of the fan 3 in the duct 5 a circuit board 8 equipped with a circuit of a signal processing system for the LCD projector (a video signal processing circuit and/or a liquid crystal panel driving circuit) and a power supply circuit for the fans 3 and 4. Also, there is disposed on the windward side of the fan 4 in the duct 6 a circuit board 9 equipped with a power supply circuit for the xenon lamp 11.

As shown in FIG. 2, a lot of openings 5a and 6a are provided in the vicinity of the front edges of the ducts 5 and 6 (edge portions on the counter side of fans 3 and 4) respectively for taking in air.

In the cooling structure, the front edges of the ducts 5 and 6 are positioned in the vicinity of the left side and the right side of the front face of the LCD projector (face having the projection lens) respectively. On the other hand, the xenon lamp 11 mounted with the heat sink 1 is positioned near the rear face of the LCD projector.

Figure 9:
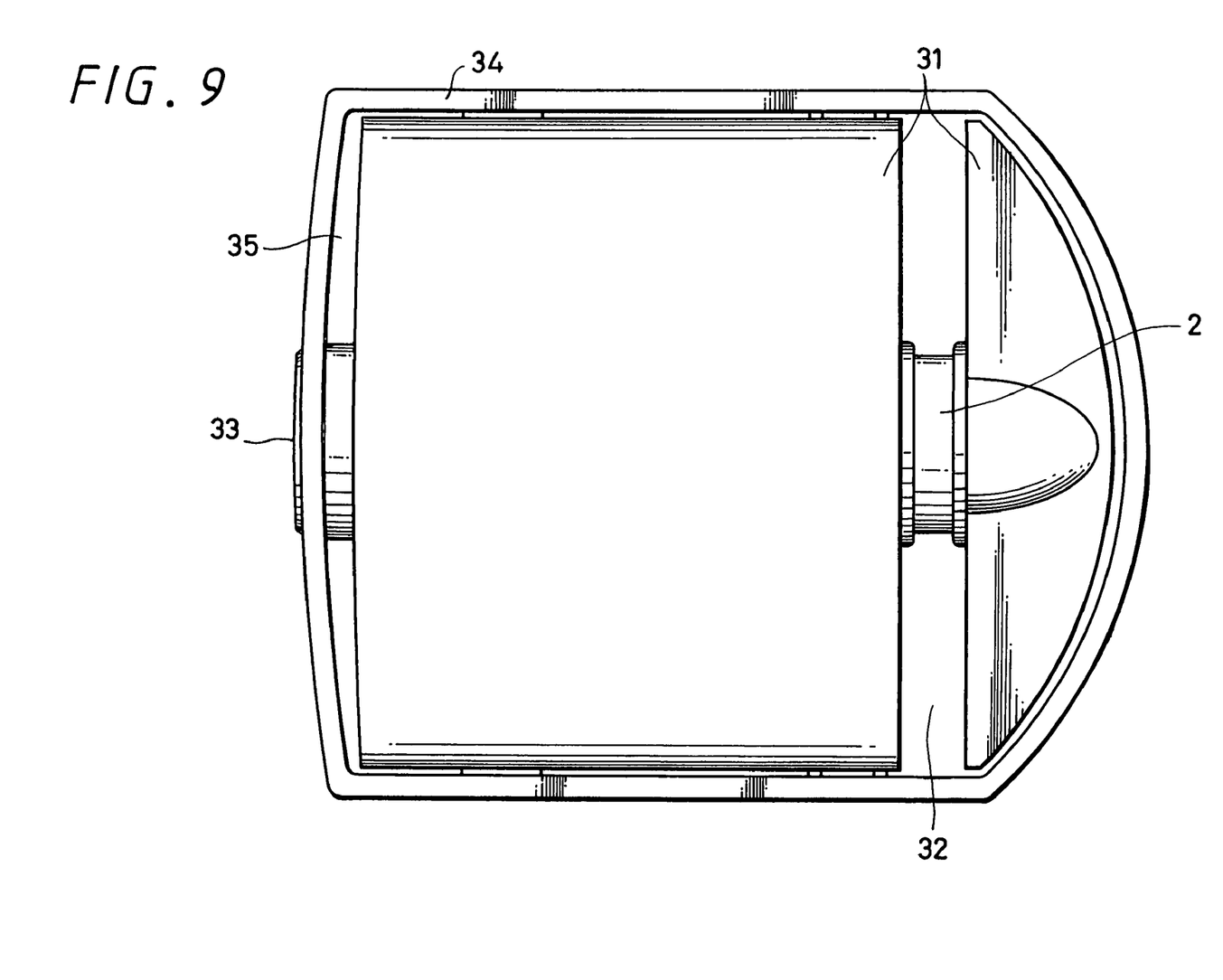
FIG. 9 a plane view of an LCD projector applied with the present invention.

FIG. 9 a plane view showing an appearance of the LCD projector. A housing 31 of this LCD projector is to be constructed to have a wellhole 32 in the vicinity of the rear portion of the LCD projector (floor can be seen through the portion of the wellhole 32 when seen from the upper side). The enclosure 2 covering the heat sink 1 (FIG. 6) is exposed to the outside of the LCD projector by being passed through the portion of the wellhole 32.

A U-shaped frame 34 having an opening portion passing through a projection lens 33 is mounted at the circumference of the housing 31 such as surrounding the front face, the side face and rear face of the LCD projector. A wellhole 35 is provided for the front face of the LCD projector by taking a distance between the housing 31 and frame 34.

Figure 10:
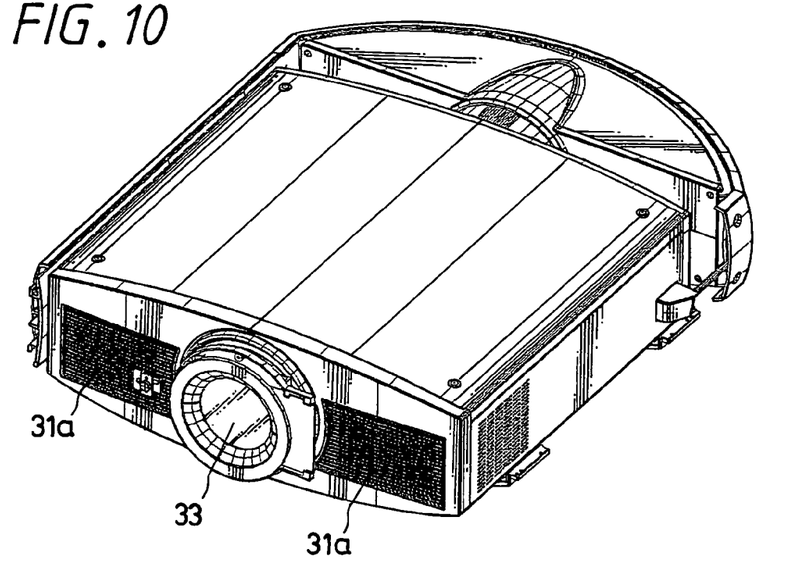
FIG. 10 a perspective view of an LCD projector applied with the present invention.

FIG. 10 is a perspective view of the LCD projector seen from the diagonal front on a condition of removing the frame 34. Inlets 31a are provided for the housing 31 respectively on the right and left portions of the projection lens 33 on the front face of the LCD projector (portions in the vicinity of the front edges of the ducts 5 and 6). The inlets 31a are constituted such that they cannot be seen from the front face of the LCD projector, because they are hidden by the frame

34. This is because it is designed such that sounds cannot leak to the outside easily from the inlet 31*a* (resonant sound design).

Figure 11:
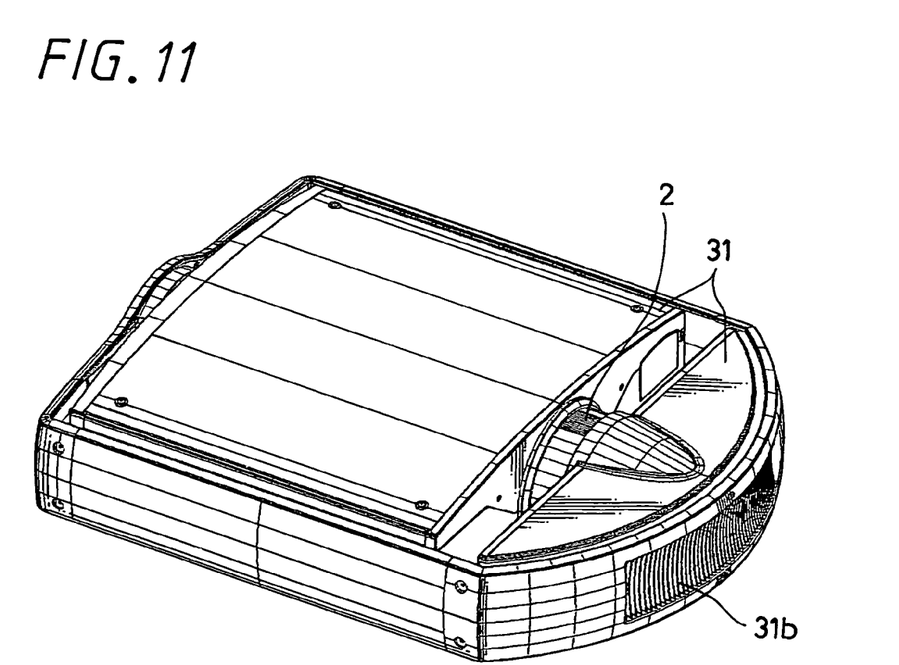
FIG. 11 a perspective view of an LCD projector applied with the present invention.

FIG. 11 is a perspective view of the LCD projector seen obliquely from behind. An outlet 31*b* is provided for the housing 31 on the rear face portion of the LCD projector (portion near the xenon lamp 11).

Next, the operational aspect of the cooling of the xenon lamp 11 in the LCD projector will be explained.

[Cooling by Means of the Fan]

When the fan 3 and 4 rotate, air of ordinary temperature external from the LCD projector is taken in from the inlet 31*a* of the housing 31 (FIG. 10) into the LCD projector, entered into the ducts 5 and 6 from the openings 5*a* and 6*a* (FIG. 2), guided in the ducts 5 and 6 and blown onto the sapphire glass 11*a* on the front face of the xenon lamp 11 (FIGS. 6 and 7) by means of the fan 3 and 4.

Then, air of high temperature warmed by the xenon lamp 11 is exhausted to the outside of the LCD projector from the outlet 31*b* of the housing 31 positioned on the rear side of the xenon lamp 11 (FIG. 11). In FIG. 2, the air flow in the LCD projector caused by these fans 3 and 4 is drawn by bold arrows.

In order to maintain the temperature of the xenon lamp properly, it is important to prevent the temperature increase of the sapphire glass on the front plane which is the light radiation plane and it is possible to prevent the temperature increase of the sapphire glass 11*a* adequately by blowing air in this manner directly onto the sapphire glass 11*a* by means of the fan disposed on the front side of the xenon lamp 11 and additively by blowing air by two of the fans 3 and 4 even if the rotational speed of the fans 3 and 4 is made lowered or small sized fans are used for the fans 3 and 4. Therefore, it is possible to cool the xenon lamp 11 operating as a light source efficiently without increasing ambient noises or without making the whole LCD projector large-sized. (According to a measurement of the present invention, the cooling efficiency was improved as much as approximately 30% as compared with a conventional case where air suction is carried out by a fan disposed on the rear side of the xenon lamp.)

In addition, the temperature of the fans 3 and 4 never increases differently from the conventional case where air suction is carried out by a fan disposed on the rear side of the xenon lamp, because the fans 3 and 4 are hit by air of ordinary temperature from the outside (air before warmed by the xenon lamp 11). In this manner, the life time and the reliability of the fans 3 and 4 are improved.

Then, it is possible to prevent the temperature increase of the sapphire glass 11*a* adequately by disposing two of the fans 3 and 4 on the diagonal left front side and on the diagonal right front side of the xenon lamp 11 so as to blow air onto the sapphire glass 11*a* on the front face of the xenon lamp 11 without blocking the light path of the light radiated from the xenon lamp 11 (on a condition that the optical system is disposed as usual at the front face on the front side of the lamp).

Further, the circuit board 8 equipped with a power supply circuit for a circuit of a signal processing system and the like is disposed in the duct 5 and at the same time the circuit board 9 equipped with a power supply circuit for the xenon lamp 11 is disposed in the duct 6, so that these power supply circuits are to be exposed to air of ordinary temperature from the outside and passing through the ducts 5 and 6. Consequently, it is possible to cool the xenon lamp 11 and at the same time to cool also these power supply circuits.

[Cooling by Means of Heat Radiation]

According to this LCD projector, the heat sink 1 mounted on the xenon lamp 11 is coated with a material (ceramic material) which has a thermal radiation characteristic, so that it is possible to cool the xenon lamp 11 also by means of heat radiation from the heat sink 1.

However, if an opaque member (general resin member, etc.) is used for the cover protecting the heat sink 1 from an external force and the like or if the heat sink 1 is covered by the housing itself of the LCD projector, the radiation heat from the heat sink 1 is absorbed or reflected by the cover and/or the housing such that heat will be transmitted again to the xenon lamp 11.

On the other hand, in this LCD projector, the heat sink 1 is covered by a transparent and colorless enclosure 2 (FIG. 6) and the enclosure 2 is made exposed to the outside of the LCD projector (FIG. 9), so that the radiation heat from the heat sink 1 is exhausted to the outside of the LCD projector by passing through the enclosure 2. In this manner, it is possible to cool the xenon lamp 11 more efficiently by utilizing the cooling effect of the heat radiation.

[Light-Shield of the Reflected Light]

According to the LCD projector as explained using FIG. 8, the light in a region outside a visible light which is reflected by adding a fixed angle from the UV/IR reflection plate 22 in the illumination optical system to the side of the xenon lamp 11 is light-shielded by the return light absorbing member 7 and does not irradiate the heat sink 1 mounted on the housing of the xenon lamp 11 or on the xenon lamp 11.

In this manner, phenomena such as the reflected light from the UV/IR reflection plate 22 makes the temperature of the xenon lamp 11 increase and the life time and the reliability of the xenon lamp 11 are lowered will disappear, so that the cooling efficiency of the xenon lamp 11 is made higher and at the same time the life time and the reliability of the xenon lamp 11 are also improved.

In addition, the temperature increase of the return light absorbing member 7 itself can be also prevented, because the air blown from the fans 3 and 4 also hits the fins of the return light absorbing member 7.

In the above examples, the present invention is applied to an LCD projector, but it should be noted that the present invention is not restricted by these examples and can also be applied, for example, to a projection type display apparatus using a spatial light modulation device such as a DMD device ("DMD" is a registered trademark) other than a liquid crystal panel or to a lamp cooling apparatus as a simple-body product.

Also, in the above examples, the present invention is applied for cooling a xenon lamp, but it is possible to apply the present invention for cooling a lamp other than a xenon lamp.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A projection type display apparatus using a lamp as a light source comprising:
    a fan disposed on a front side of said lamp for blowing air onto a front face of said lamp;
    an inlet for receiving external air into the inside of said projection type display apparatus;

a duct for guiding air from said inlet to said fan;

an outlet for exhausting the air blown onto said lamp to the outside of said projection type display apparatus;

a reflection plate for reflecting light that is outside of a visible region included in light radiated from said lamp at an angle away from said lamp; and a member disposed in front of said lamp for guiding radiated light from said lamp to said reflection plate and for shielding the light reflected from said reflection plate.

2. A projection type display apparatus according to claim 1, wherein said lamp is a xenon lamp and said fan blows air onto a glass of the front face of said xenon lamp.

3. A projection type display apparatus according to claim 1, wherein two fans are disposed as said fan on a diagonal left front side and on a diagonal right front side respectively with reference to said lamp.

4. A projection type display apparatus according to claim 1, wherein a heat sink which is coated with a material having a thermal radiation characteristic is mounted on said lamp;

said heat sink is covered by a transparent member; and said transparent member is exposed to the outside of said projection type display apparatus.

5. A projection type display apparatus according to claim 1, wherein a power supply circuit is disposed in said duct.

6. A lamp cooling apparatus comprising:

a lamp;

a fan disposed on a front side of said lamp for blowing air onto a front face of said lamp;

a duct for guiding external air to said fan;

a reflection plate for reflecting light that is outside of a visible region included in light radiated from said lamp at an angle away from said lamp; and a member disposed in front of said lamp for guiding radiated light from said lamp to said reflection plate and for shielding the light reflected from said reflection plate.

7. A lamp cooling apparatus according claim 6, wherein said lamp is a xenon lamp and said fan blows air onto a glass of the front face of said xenon lamp.

8. A lamp cooling apparatus according claim 6, wherein two fans are disposed as said fan on a diagonal left front side and on a diagonal right front side respectively with reference to said lamp.

9. A lamp cooling apparatus according claim 6, wherein a heat sink which is coated with a material having a thermal radiation characteristic is mounted on said lamp; and said heat sink is covered by a transparent member.

* * * * *